(12) United States Patent
Lee et al.

(10) Patent No.: US 11,518,675 B2
(45) Date of Patent: Dec. 6, 2022

(54) NANOASSEMBLY METHODS FOR PRODUCING QUASI-THREE-DIMENSIONAL NANOARRAYS

(71) Applicant: Purdue Research Foundation, West Lafayette, IN (US)

(72) Inventors: Chi Hwan Lee, West Lafayette, IN (US); Zahyun Ku, Beavercreek, OH (US); Augustine Michael Urbas, Oakwood, OH (US); Bongjoong Kim, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 139 days.

(21) Appl. No.: 17/126,316

(22) Filed: Dec. 18, 2020

(65) Prior Publication Data

US 2021/0229987 A1 Jul. 29, 2021

Related U.S. Application Data

(60) Provisional application No. 62/949,769, filed on Dec. 18, 2019.

(51) Int. Cl.
*B82B 3/00* (2006.01)
*B82Y 40/00* (2011.01)
(Continued)

(52) U.S. Cl.
CPC ............ *B82B 3/0014* (2013.01); *G02B 5/008* (2013.01); *B82Y 30/00* (2013.01); *B82Y 40/00* (2013.01); *G02B 2207/101* (2013.01)

(58) Field of Classification Search
CPC ....... B82B 3/0014; G02B 5/008; B82Y 30/00; B82Y 40/00
See application file for complete search history.

(56) References Cited

U.S. PATENT DOCUMENTS 8,815,707 B2 8/2014 Lee et al.

OTHER PUBLICATIONS

Kim et al., Deterministic Nanoassembly of Quasi-Three-Dimensional Plasmonic Nanoarrays with Arbitrary Substrate Materials and Structures, Nano Letters, vol. 19, pp. 5796-5805, Jul. 26, 2019. (Year: 2019).*

(Continued)

*Primary Examiner* — Michael P Wieczorek
(74) *Attorney, Agent, or Firm* — Hartman Global IP Law; Gary M. Hartman; Domenica N. S. Hartman

(57) ABSTRACT

Nanoassembly methods for producing quasi-3D plasmonic films with periodic nanoarrays of nano-sized surface features. A sacrificial layer is deposited on a surface of a donor substrate having periodic nanoarrays of nanopattern features formed thereon. A plasmon film is deposited onto the sacrificial layer and a dielectric spacer is deposited on the plasmon film. The donor substrate having the sacrificial layer, plasmon film, and dielectric spacer thereon is immersed in a bath of etchant to selectively remove the sacrificial layer such that the plasmon film and the dielectric spacer thereon adhere to the surface of the donor substrate. The dielectric spacer and the plasmon film are mechanically separated from the donor substrate to define a quasi-three dimensional (3D) plasmonic film having periodic nanoarrays of nano-sized surface features defined by the nanopattern features of the donor substrate surface. The quasi-3D plasmonic film is then applied to a receiver substrate.

20 Claims, 6 Drawing Sheets

(51) Int. Cl.
  *G02B 5/00* (2006.01)
  *B82Y 30/00* (2011.01)

(56) References Cited

OTHER PUBLICATIONS

Wie, D.S et al., "Wafer-Recyclable, Environment-Friendly Transfer Printing for Large-Scale Thin-Film Nanoelectronics", PNAS Latest Articles, www.pnas.org/cgi/doi/10.1073/pnas.1806640115, (pp. 1-9), NPL Date: 2018.
Zhang, Y et al., "Chemomechanics of Transfer Printing of Thin Films in a Liquid Environment", International Journal of Solids and Structures, https://doi.org/10.1016/j.ijsolstr2019.07.011, (pp. 1-15), NPL Date: 2019.

* cited by examiner

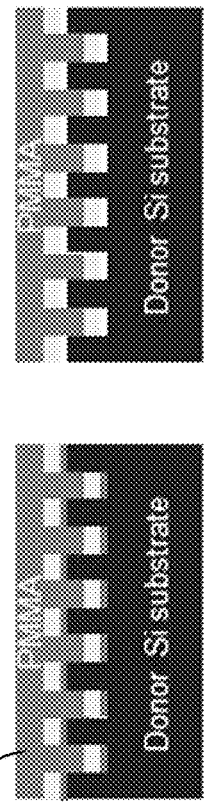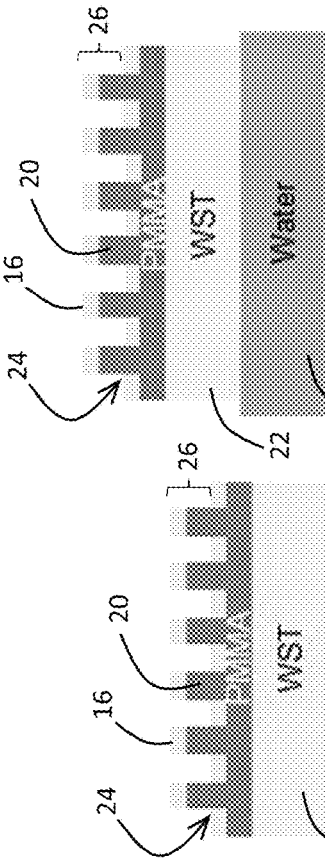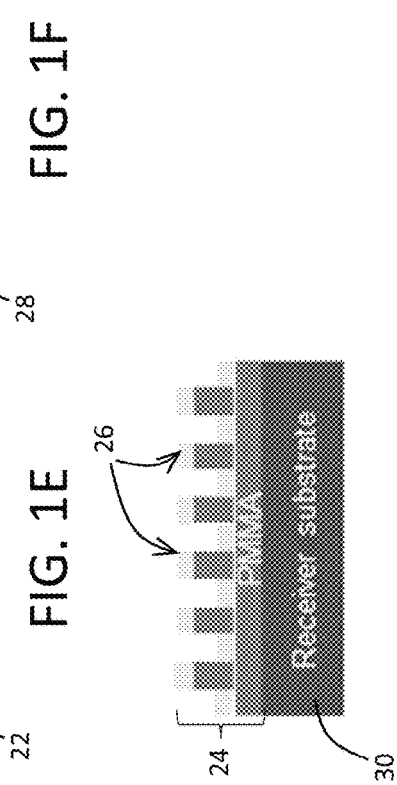
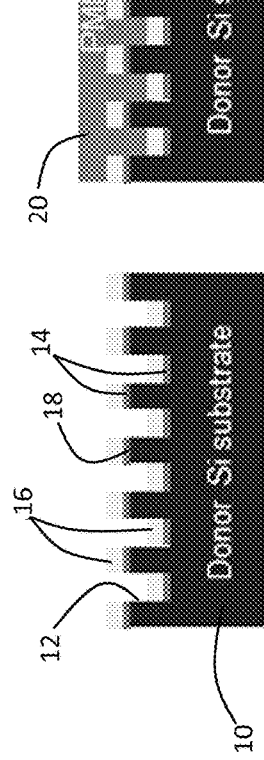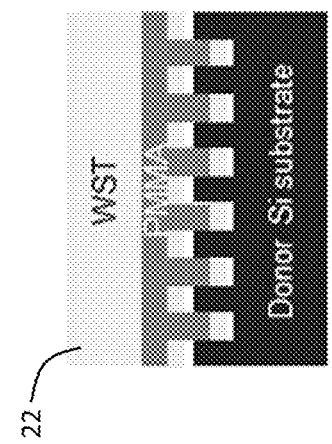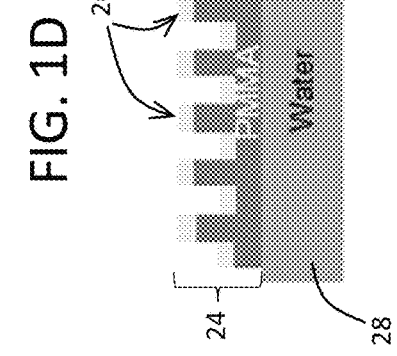
FIG. 1A  FIG. 1B  FIG. 1C
FIG. 1D  FIG. 1E  FIG. 1F
FIG. 1G  FIG. 1H

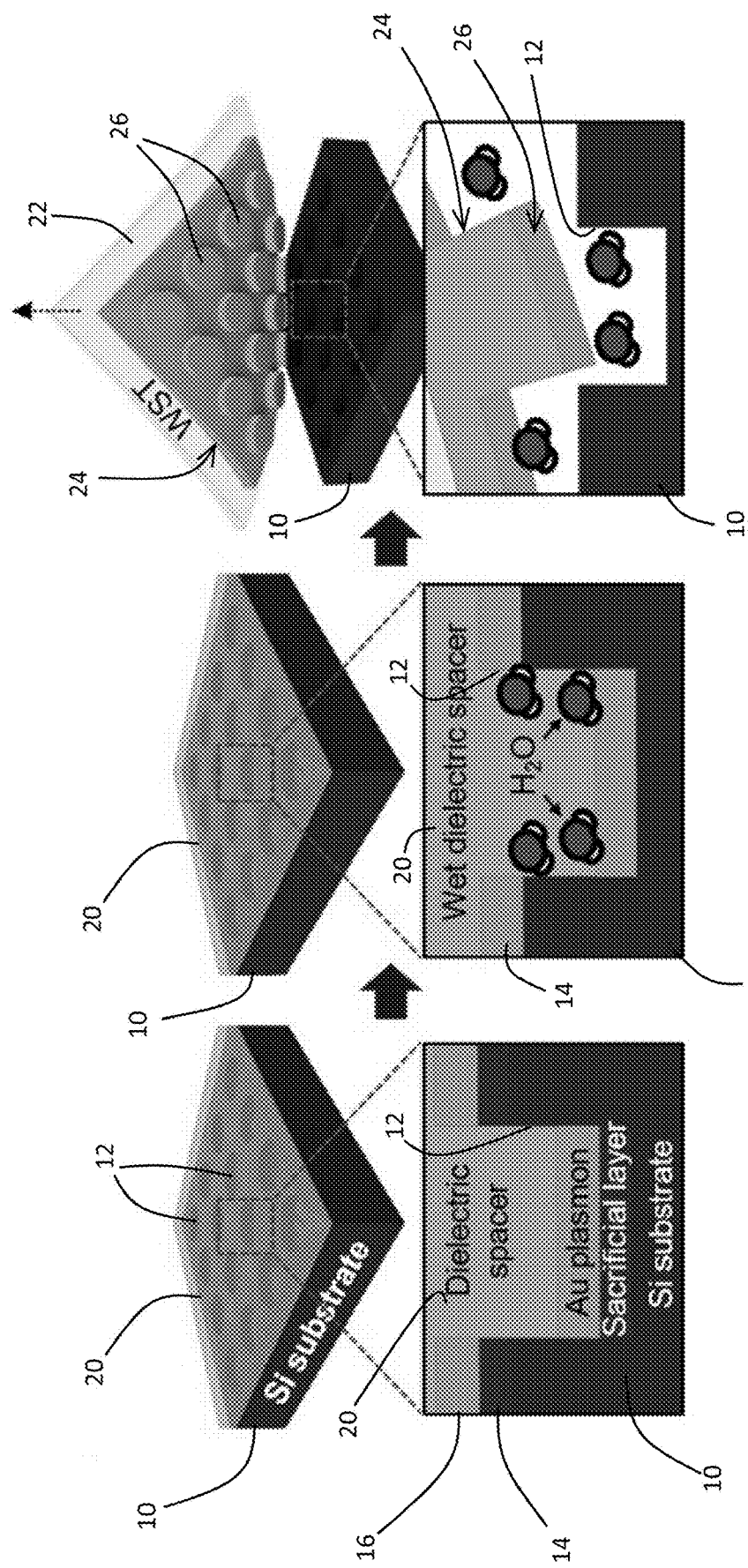

FIG. 3A
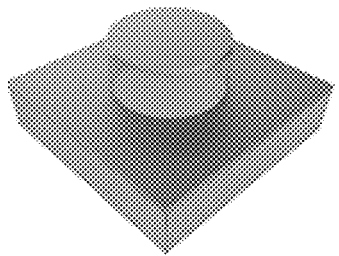 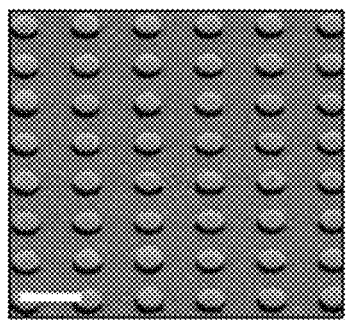 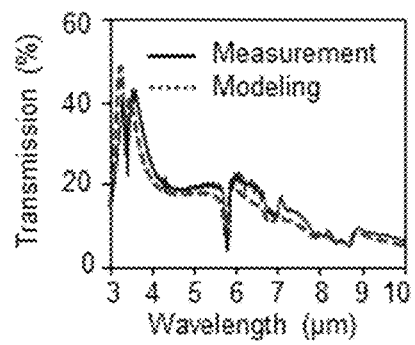
FIG. 3B
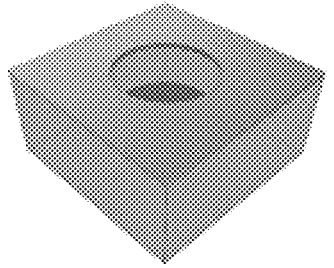 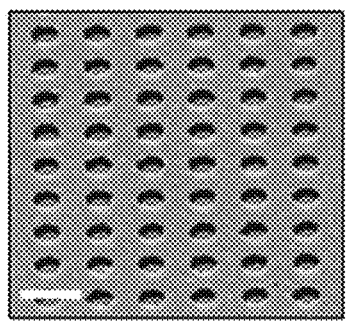 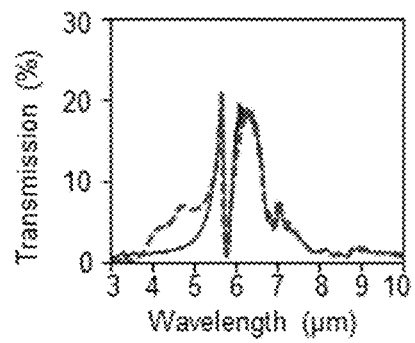
FIG. 3C
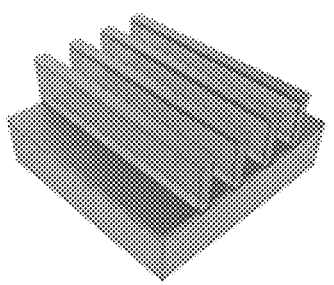 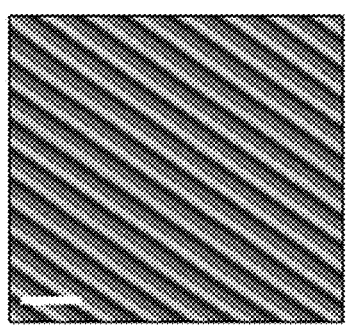 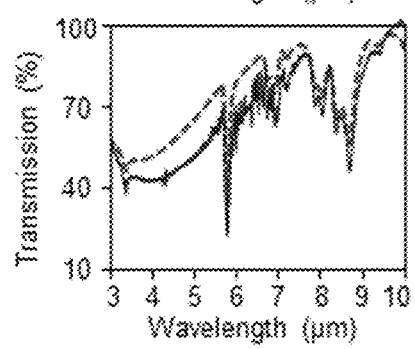
FIG. 3D
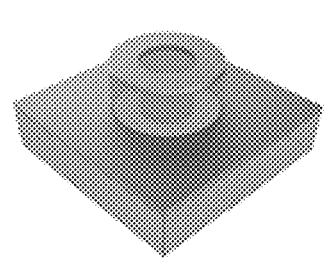 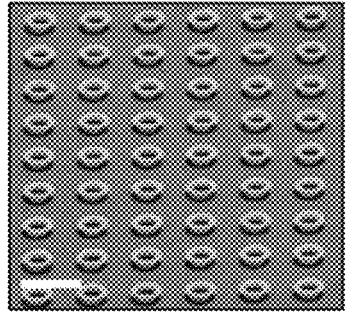 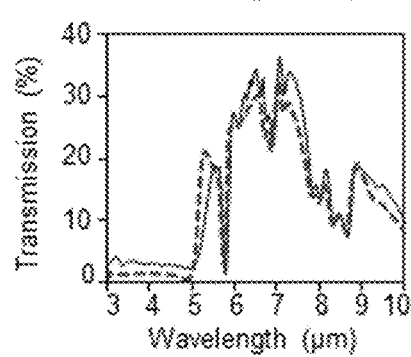

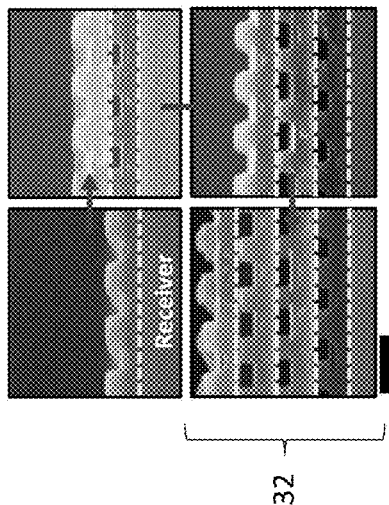
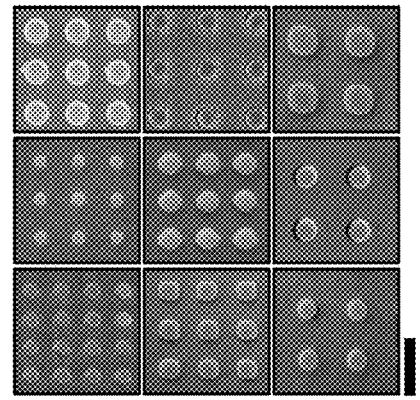
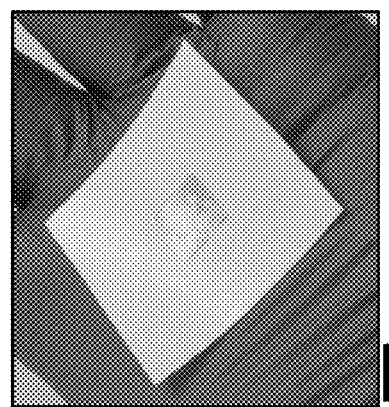
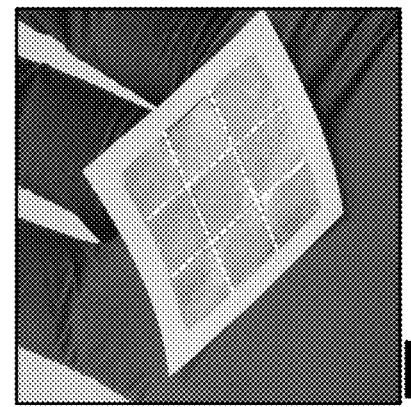
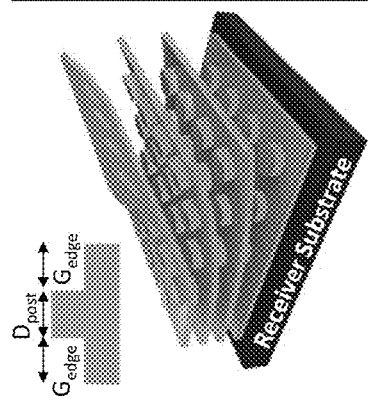
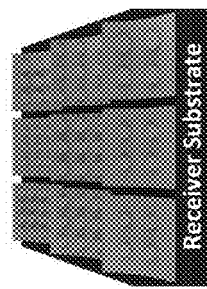
FIG. 5A
FIG. 5B

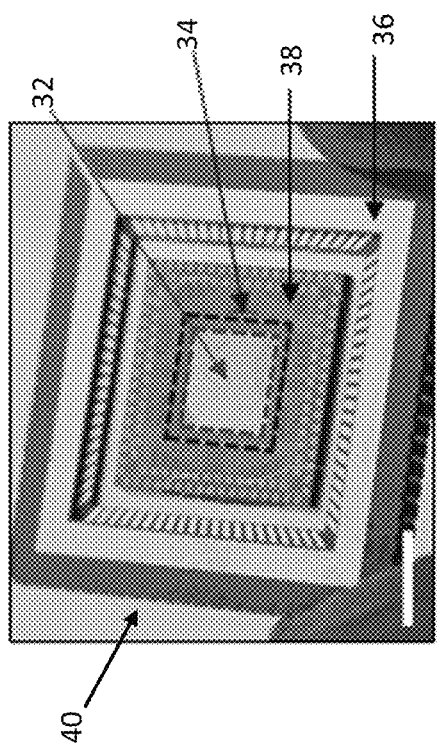
FIG. 6
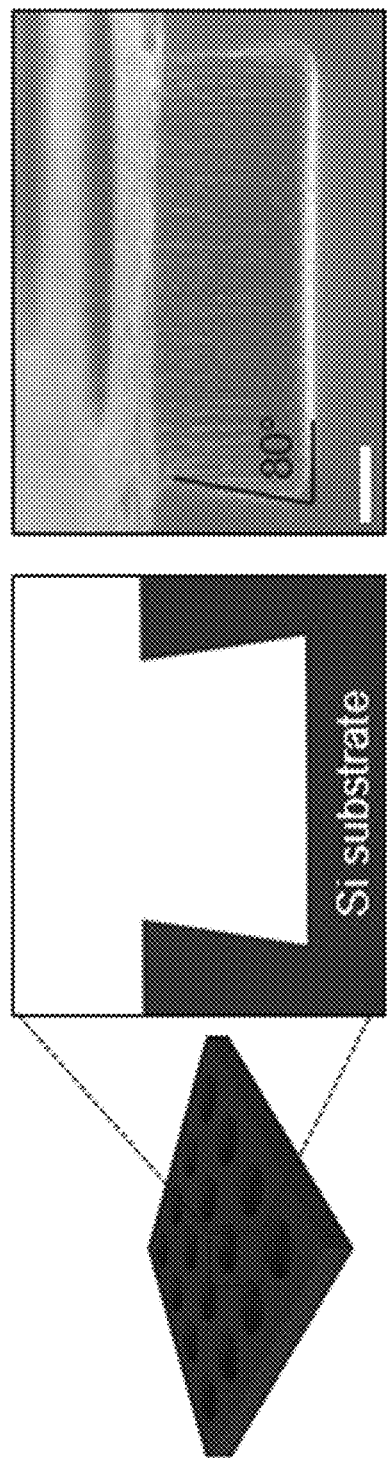
FIG. 7A
FIG. 7B

NANOASSEMBLY METHODS FOR PRODUCING QUASI-THREE-DIMENSIONAL NANOARRAYS

CROSS-REFERENCE TO RELATED APPLICATIONS

This application claims the benefit of U.S. Provisional Application No. 62/949,769, filed Dec. 18, 2019, the contents of which are incorporated herein by reference.

STATEMENT REGARDING FEDERALLY SPONSORED RESEARCH

This invention was made with government support under contract number FA8650-16-D-5403 awarded by the Air Force Research Laboratory (AFRL), and under Sponsor Award No. 1928784-CMMI awarded by the National Science Foundation. The government has certain rights in the invention.

BACKGROUND OF THE INVENTION

The present invention generally relates to quasi-three-dimensional (quasi-3D) nanoarrays. The invention particularly relates to assembly methods for producing quasi-3D plasmonic films with periodic nanoarrays comprising nano-sized surface features, wherein the methods involve limited physical contact during the assembly process.

Interaction of incident light with quasi-3D plasmonic nanoarrays provides capabilities to manipulate light at nanoscale lengths in ways that cannot be obtained with conventional optics. Diverse types of quasi-3D plasmonic nanoarrays with tailored feature shapes, sizes and configurations have been explored for a broad range of light-driven sensors and actuators, including imagers, light displays, biological sensors, lasers, and antennas.

Traditionally, the construction of quasi-3D plasmonic nanoarrays has largely relied on the use of nanolithography techniques such as electron-beam (e-beam) lithography, focused ion-beam lithography and interference lithography, but their laborious, complex and time-consuming nature impedes practical applications. In addition, these nanolithography methods often require the use of thermal and chemical treatments, leading to additional increase of complexity and risk in protecting the substrate materials.

Alternative strategies exploit advanced printing techniques such as nanoimprinting and modular transfer printing, allowing for deterministic integration of quasi-3D plasmonic nanoarrays with a foreign receiver substrate, and thereby circumventing the incompatibility of the nanolithography conditions with substrate materials. Nevertheless, the choice of receiver substrate remains limited by the required physical contact forces during printing steps, yielding an increased risk of potential damages to several substrates composed of mechanically fragile materials and structures.

In view of the above, though manipulation of light through nanoarrays of 3D patterns provides unique opportunities to harness light, practical implementation has been hindered by a lack of effective methodology. As such, it would be desirable if methods were available for producing nanoarrays of quasi-3D plasmonic nanoarrays that were capable of at least partly overcoming or avoiding the problems, shortcomings or disadvantages noted above.

BRIEF DESCRIPTION OF THE INVENTION

The present invention provides nanoassembly methods suitable for producing quasi-3D plasmonic films with periodic nanoarrays of nano-sized surface features.

According to one aspect of the invention, a method is provided that includes providing a donor substrate comprising periodic nanoarrays of nanopattern features formed on a surface thereof, depositing a sacrificial layer on the surface of the donor substrate, depositing a plasmon film onto the sacrificial layer, depositing a dielectric spacer onto the plasmon film, immersing the donor substrate having the sacrificial layer, plasmon film, and dielectric spacer thereon in a bath of etchant to selectively remove the sacrificial layer such that the plasmon film and the dielectric spacer thereon adhere to the surface of the donor substrate, mechanically separating the dielectric spacer and the plasmon film from the donor substrate to define a quasi-three dimensional (3D) plasmonic film that comprises the dielectric spacer and the plasmon film and has periodic nanoarrays of nano-sized surface features defined by the periodic nanoarrays of nanopattern features formed on the surface of the donor substrate, and applying the quasi-3D plasmonic film to a receiver substrate.

According to another aspect of the invention, a method is provided that includes providing two or more quasi-3D plasmonic films that may be produced as described above, and then applied to a receiver substrate in a stacked configuration.

Technical effects of methods as described above preferably include the ability to produce quasi-3D plasmonic films having periodic nanoarrays thereon with limited physical contact during the fabrication of the films on a donor substrate, thereby reducing the risk of damaging the donor substrate and the plasmonic films.

Other aspects and advantages of this invention will be appreciated from the following detailed description.

BRIEF DESCRIPTION OF THE DRAWINGS

FIGS. 1A through 1H schematically represent certain steps of a nanoassembly method for fabricating quasi-3D plasmonic films having periodic nanoarrays of nano-sized surface features in accordance with certain nonlimiting aspects of the invention.

FIGS. 2A through 2C schematically represent a sequence of physical debonding and separation of a quasi-3D plasmonic film from a surface of a donor substrate, wherein the surface of the donor substrate has a periodic nanopattern of nanoholes and the resulting plasmonic film is formed to have complementary periodic nanoarrays of nano-sized nanoposts.

FIGS. 3A through 3D depict aspects of quasi-3D plasmonic films with periodic nanoarrays of different types of nano-sized surface features. Each of FIGS. 3A through 3D includes a schematic representation of a single nano-sized surface feature (left), an SEM image (middle column), and analysis of transmission spectra (right) of the quasi-3D plasmonic film thereof. The surface features shown are nanoposts (FIG. 3A), nanoholes (FIG. 3B), bilayer nanowire gratings (FIG. 3C), and ring-shaped disks (FIG. 3D). Scale bars in the SEM images of FIGS. 3A through 3D are, respectively, 3.3 µm, 2.0 µm, 1.8 µm, and 2.0 µm from the top.

FIG. 5A contains images showing the progressive stacking of multiple plasmonic films having dissimilar quasi-3D nanoposts. Scale bar is 2.3 µm. FIG. 5B contains images of nine plasmonic films having dissimilar quasi-3D nanoposts of different sizes and spacings. Scale bar is 3.3 µm.

FIG. 6 is an image showing a quasi-3D plasmonic film with periodic nanoarrays of nanoposts applied to a preexisting image detector. Scale bar is 4.5 mm.

FIG. 7A is a schematic representation of a nanohole formed in a donor substrate to be tapered by about 80° relative to the interior lower surface of the nanohole, and FIG. 7B shows a cross-sectional SEM image of a tapered nanohole having substantially the same taper as shown in FIG. 7A. Scale bar is 160 nm.

DETAILED DESCRIPTION OF THE INVENTION

Figure 4A:
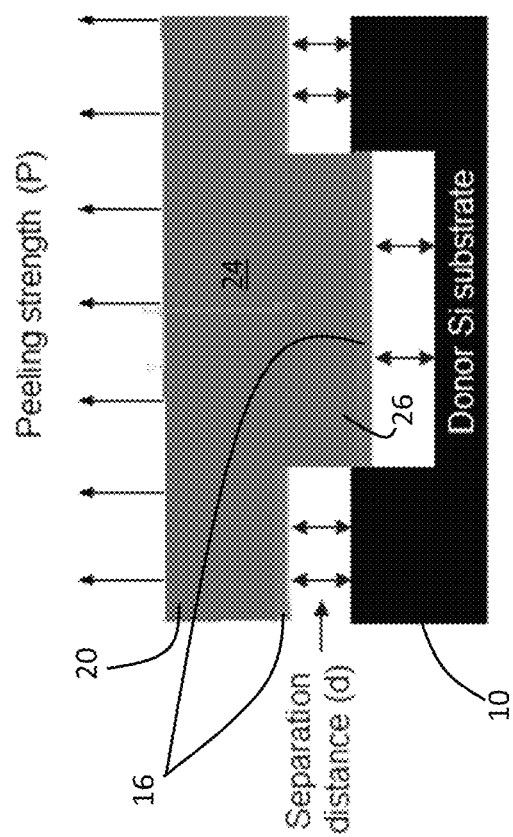
FIGS. 4A and 4B represent a schematic of a modeled structure (FIG. 4A) and FEA results of peeling strength (P)-debonding distance (d) curves for quasi-3D nanoposts in dry and wet conditions (FIG. 4B).

Disclosed herein are quasi-3D nanoarrays, particularly quasi-3D plasmonic films with periodic nanoarrays of nano-sized surface features, and nanoassembly methods for the fabrication of such quasi-3D nanoarrays. As used herein, "nano-sized features" and "nano-sized surface features" are understood to refer to features having a maximum dimension of not more than 10 micrometers, a "nanoarray" is understood to refer to a two-dimensional (2D) array of nano-sized features, and "quasi-3D" is understood to refer to a 3D structure with a thickness of one nano-sized feature in the third (z) dimension. The nanoassembly methods entail the fabrication of quasi-3D films including nano-sized surface features thereof on donor fabrication substrates (or simply "donor substrates"), intact separation of the quasi-3D films from their donor fabrication substrates, and subsequent transfer of the quasi-3D films to a receiver substrate, as well as devices and systems that utilize one or more of such quasi-3D films, as a nonlimiting example, to manipulate light at nanoscale lengths. Unlike conventional approaches, the entire nanoassembly method may occur in distilled water at room temperature without the need of further chemical, thermal and mechanical treatments, allowing for the possibility of the donor fabrication substrates to be reused and/or the use of a wide variety of materials, structures, and devices as receiver substrates, as nonlimiting examples, wafers, preexisting electro-optical (EO) sensors, and other electronic devices of interests.

Nonlimiting embodiments of the invention are described below in reference to experimental investigations leading up to the invention.

Nonlimiting process steps utilized by investigations leading to the present invention are schematically illustrated in FIGS. 1A through 1H. In the investigations, quasi-3D plasmonic films of periodic nanoarrays were fabricated on silicon donor substrates that were each processed to have a periodic nanoarray of nanopattern features in or on (in FIGS. 1A through 1H, recesses or nanoholes defined in) one of their surfaces. Nonlimiting examples of suitable methods for forming nanopatterns on donor substrates include lithography techniques, for example, e-beam, interference lithography, photolithography, nanoimprint, focused ion beam, etc. In FIGS. 1A through 1H, the nanopattern features 12 are schematically illustrated as recesses or nanoholes 12 defined in a surface 18 of a donor substrate ("Donor Si substrate") 10. The quasi-3D plasmonic films were fabricated on the nanopatterned donor substrates 10 by first depositing a sacrificial nickel (Ni) layer 14 (about 10 nm) and a gold (Au) plasmon film 16 (about 50 nm) with an e-beam evaporator (not shown), such that the sacrificial layer 14 and the plasmon film 16 were deposited within the nanoholes 12 and on the surface 18 of the donor substrate 10 (FIG. 1A). Though nickel was used as the sacrificial layer 14 and gold was used as the plasmon film 16, the sacrificial layer 14 and plasmon film 16 could be formed by a wide variety of other materials known to those skilled in the art, and such materials are within the scope of the invention, as nonlimiting examples, plasmon films formed of aluminum, silver, etc. Thereafter, a dielectric spacer 20 was deposited on the surface of the plasmon film 16 by spin-coating (FIG. 1B). The dielectric spacer 20 is identified in FIG. 1B as "PMMA" (poly(methyl methacrylate)), though the dielectric spacer 20 could be formed by a wide variety of other dielectric materials known to those skilled in the art and such materials are within the scope of the invention, as nonlimiting examples, benzocyclobutene (BCB) and SU-8 (whose composition is reported to be based on a multifunctional bisphenol A novolak epoxy resin and a photoacid generator as a curing agent). The entire structure was immersed in a bath of a nitric acid aqueous solution (Nickel Etch TFB, Transene Company, Inc.) to exclusively remove the sacrificial layer 14 beneath the plasmon film 16, allowing the remaining films (the plasmon film 16 and dielectric spacer 20) to sink and adhere on the surface 18 of the silicon donor substrate 10 by van der Waals adhesive force (FIG. 1C). The resulting structure was then rinsed with distilled water to keep the dielectric spacer 20 wet while its top surface was wiped to stay dry. A water-soluble tape 22 ("WST," Aquasol Corporation) was then attached to serve as a temporary handling holder for the plasmon film 16 and dielectric spacer 20 (FIG. 1D). Mechanical peeling of the water-soluble tape 22 was performed at a constant rate using an automated tool, resulting in intact separation from the donor substrate 10 of a quasi-3D plasmonic film 24 formed by the plasmon film 16 and dielectric spacer 20, which together formed what may be referred to as a metal-dielectric composite (FIG. 1E). In the nonlimiting embodiment shown, the nanoholes 12 in the surface 18 of the donor substrate 10 has resulted in the quasi-3D plasmonic film 24 comprising a periodic nanoarray of quasi-3D nano-sized surface features 26 in the form of nanoposts that were shaped and sized complementary to the nanoholes 12, spaced laterally across the plasmonic film 24, and project in a direction generally normal to the bulk of the plasmonic film 24. Placement of the water-soluble tape 22 on the surface of water 28 at room temperature (FIG. 1F) leads to complete dissolution of the tape 22, allowing the quasi-3D plasmonic film 24 to stay afloat on the surface of the water 28 (FIG. 1G).

FIG. 1H schematically represents a quasi-3D plasmonic film 24 fabricated as described above as transferred to receiver substrate 30, as a nonlimiting example, a double-side polished (DSP) silicon wafer. For this step in the investigation, the receiver substrates were immersed in distilled water (about 50 mL) contained in a petri dish on a probe station. Each receiver substrate was immersed beneath the water by a distance of less than 1 mm. A plasmonic film 24 was then floated on the water surface and positioned and aligned with the receiver substrate 30 using a micromanipulator (not shown) capable of full X-Y movements and 360° rotation. Once the plasmonic film 24 was aligned with the receiver substrate 30, water was slowly removed from the petri dish until the plasmonic film 24 settled onto the upper surface of the receiver substrate 30, at which time the film 24 remained adhered to the surface of the substrate 30 via van der Waals force. Misalignment of a plasmonic film 24 with its receiver substrate 30 was corrected by soaking the plasmonic film 24 with water introduced at an angle of about 20° from the water surface, which caused the misaligned plasmonic film 24 to be released intact from the receiver substrate 30 by surface tension of the water. Once a plasmonic film 24 was properly aligned and adhered to the surface of a receiver substrate 30, the resulting structure was either dried at room temperature to secure the interfacial bonding with the receiver substrate 30 or, if permitted by the receiver substrate 30, was annealed to promote adhesion (FIG. 1H), as a nonlimiting example, at a temperature of about 60° C. for about 10 minutes in a convection oven. Testing of interfacial adhesion evidenced that annealing was capable of increasing adhesion strength of a plasmonic film 24 to the surface of a receiver substrate 30 by more than 50% as compared to the interfacial adhesion achieved at room temperature.

FIGS. 2A through 2C are schematic illustrations depicting the physical separation of a quasi-3D plasmonic film 24 from a donor substrate 10 that was fabricated to have a periodic nanoarray of nanopattern features 12 in or on (in this embodiment, recesses or nanoholes defined in) one of its surfaces. FIGS. 2A through 2C generally correspond to FIGS. 1B, 1C, and 1D, respectively. By modifying the form of the nanopattern features 12 formed on the surface of a donor substrate 10, quasi-3D plasmonic films with periodic nanoarrays comprising various forms of surface features 26 are within the scope of the invention.

FIG. 3A includes a schematic representation of a nanopost (left), a scanning electronic microscope (SEM) image of a quasi-3D plasmonic film having an nanoarray of nanoposts (middle), and experimental and modeling results of transmission spectra measurements obtained with a Fourier transform infrared (FTIR) spectrometer (Nicolet 5700) and a Computer Simulation Technology Microwave Studio (CST-MWS) based on a finite integration technique (FIT) (right). FIGS. 3B, 3C, and 3D similarly include schematic representations, SEM images, and experimental and modeling transmission spectra measurements of quasi-3D plasmonic films having periodic nanoarrays of, respectively, nanoholes, gratings, and ring-shaped disks. Examination with SEM and optical imaging of transferred quasi-3D plasmonic films on their receiver substrates evidenced no visual defects or damage. Repetitive transmission spectra measurements at widely spread locations on these nanoarrays produced consistent outcomes, highlighting the uniform integrity of the nano-scaled features over the surfaces of the films. Following removal of the plasmonic films, optical images in their silicon donor substrates confirmed the integrity of the donor substrates, evidencing their ability to be reused as a cost-saving factor.

Figure 4B:
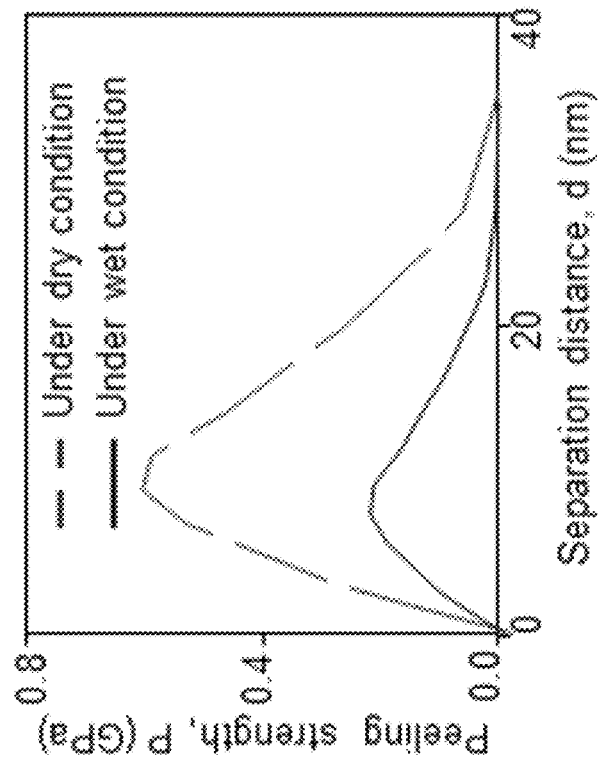

FIGS. 4A and 4B represent a schematic of a modeled structure (FIG. 4A) and exemplary finite element analysis (FEA) results of peeling strength (P) versus debonding distance (d) curves for quasi-3D plasmonic films 24 with periodic nanoarrays of nanoposts 26 (e.g., FIG. 3A) in dry (20% relative humidity) and wet (water) conditions (FIG. 4B). The interfacial separation between the quasi-3D plasmonic films 24 and their silicon donor substrates 10 under wet conditions occurred by overcoming the wet adhesion of confined water molecules between the plasmon films 16 and the surfaces of the silicon donor substrates 10 from which the sacrificial layer 14 had been completely removed. Experimental and FEA results of debonding load-displacement (d) curves of 1×1 cm² quasi-3D plasmonic films (50 nm Au plasmon film with a 1 µm PMMA dielectric spacer) with periodic nanoarrays of nanoposts 26 under dry and wet conditions consistently evidenced that the debonding load (L) rapidly increased within about 1 mm of an edge of the film 24, and then decreased until becoming generally constant to a steady state load ($L_{ss}$). Notably, a substantial decrease in $L_{ss}$ of more than about 70% occurred under wet conditions as compared with dry conditions, indicating that the presence of water resulted in the reduction of interfacial energy at the 3D nanotextured surfaces of the plasmonic films 24.

Experimental, computational (FEA), and theoretical results revealed the effect of the height, $H_{post}$, of a nanopost on $L_{ss}$. The results indicated that the steady state debonding load per unit width ($L_{ss}/b$) increased with increasing $H_{post}$ from 200 nm to 400 nm, which was attributed to the increased deformation energy required for longer nanoposts. In theory, the energy balance of quasistatic interfacial debonding can be expressed as: $W_L = W_{interface} + W_{deformation}$, where $W_L$ (=$L_{ss} \cdot \Delta D$) is the work done by the $L_{ss}$ and $\Delta D$ is the debonding displacement; $W_{interface}$ (=$G \cdot b \cdot \Delta D$) is the interfacial adhesion energy between a plasmonic film and silicon donor substrate, where G is the adhesion energy per unit area at the interface; $W_{deformation}$ (=$u \cdot b \cdot \Delta D \cdot H_{post}$) is the deformation energy from the quasi-3D nanoposts, where u is the deformation energy density. As a consequence, the energy balance can be further written as: $L_{ss}/b = G + u \cdot H_{post}$, wherein G and u are independent of the $H_{post}$ because both the interface and materials properties of the quasi-3D nanoposts remain unchanged. These assessments were consistent with the findings that $L_{ss}$ under wet conditions was substantially less than under dry conditions for the same $H_{post}$, mainly due to the reduced interfacial adhesion energy by the effect of water molecules. Evaluations of similar quasi-3D Au/PMMA plasmonic films but configured with periodic nanoarrays of nanoholes (e.g., FIG. 3B) produced consistent results to support and confirm these findings.

Modeling (FEA) results revealed that the underlying strain distribution of the plasmonic film during the interfacial debonding process under dry and wet conditions. The modeled structure included a unit of Au (50 nm)/PMMA (1 µm) plasmonic film configured with quasi-3D nanoposts ($H_{post}$=300 nm) and nanoholes ($H_{hole}$=300 nm). The results revealed that the maximum principal strain ($\varepsilon_{max}$) appeared in the PMMA dielectric spacer where the magnitude in the wet condition was more than 60% less than that in the dry condition. This aspect allowed the plasmonic film to experience insignificant mechanical constraints during the interfacial debonding process and thereby was able to reduce the potential risk of defects, as also consistent with the above-mentioned experimental observations. Modeling was also performed for varied $H_{post}$ and $H_{hole}$ as well as different dielectric spacers such as BCB and SU-8 under dry and wet conditions.

The ability to assemble several identical or different types of quasi-3D plasmonic films in a spatially controlled manner provides a mean of attaining advanced light manipulation. FIG. 5A contains SEM images depicting the progressive application of quasi-3D plasmonic films with periodic nanoarrays of nanoposts to create a multilayered plasmonic film stack 32. The relative alignment error of each stacked film was below 1 µm, which can be further improved by employing alignment marks. The nanoposts of the plasmonic films seen in FIG. 5A were similar in terms of diameters ($D_{post}$ of about 1.0 µm) and spacings ($G_{edge}$ of about 0.4 µm), though stacking of plasmonic films with dissimilar nanoposts or with smaller and greater diameters and spacings is also within the scope of the invention. As a nonlimiting example, FIG. 5B represents plasmonic films formed with dissimilar nanoposts in terms of different diameters ($D_{post}$ of about 1.0 µm to about 2.3 µm) and spacings ($G_{edge}$ of about 0.6 µm to about 1.6 µm). The plasmonic films of FIG. 5B were sequentially transferred from a silicon donor substrate to a receiver substrate (a DSP wafer) loaded on a temporary handling holder. Adhesion at the interface between each transferred plasmonic film was secured by a post-annealing treatment in a convention oven at, for example, 60° C. for 10 minutes. The SEM images shown in FIG. 5B and corresponding transmission spectra measurements indicated that no defects occurred throughout the multiple stacking process. These investigations highlighted the spatial controllability and modular capability of the nanoassembly method descried herein, evidencing its suitability for use in surface plasmon applications.

FIG. 6 is an optical image of an individual quasi-3D plasmonic film 24 produced and applied to a preexisting electro-optical (EO) sensor 40 by a nanoassembly method of this invention. A hybrid pixel detector (HPD) 34 served as the receiver substrate. Basic components of the HPD 34 included GaSb for contacts, InAs/GaSb/InSb for active (×300 layers)/bottom (×80 layers) superlattice and indium (In) bumps for connections, all assembled with a silicon fan-out chip 38 through a flip-chip-on-laminate process. The materials and structures of the HPD 34 represent a chemically and mechanically vulnerable receiver substrate that is otherwise difficult to directly construct quasi-3D plasmonic films by conventional nanofabrication technologies.

The assembly process used to construct the sensor 40 began by mounting and wire-bonding the HPD 34 to a leadless chip carrier (LCC) 36 to characterize device performance (spectral response, photocurrent, and dark current, etc.). The LCC 36 also served as a temporary handling holder that allowed the HPD 34 to avoid any physical contact during the entire process. The resulting structure was then immersed in water while the quasi-3D plasmonic film 24 (Au (50 nm)/PMMA (800 nm), 1×1 cm$^2$) configured with nanoposts ($H_{post}$=0.2 µm, $D_{post}$=1 µm, $G_{edge}$=1 µm) was afloat on the water surface. Subsequent alignment took place on a probe station with full X-Y movements and 360° rotation under microscope examination. Drying of the fully assembled unit occurred at room temperature. Microscope and SEM examination of the completed sensor 40 evidenced no damage or defects to the HPD 34.

Post-analysis occurred in a custom setup that allowed for the acquisition of optical-to-electrical measured spectral responses at 77K. The results showed that distinct oscillatory characteristics appeared in all of the spectral responses, which was attributed to the Fabry-Perot cavity resonances between air and the embedded mirror planes consisting of ohmic contact under the In bump metallization. Light transmitted through narrow gaps of the nanoposts of the quasi-3D plasmonic film 24 exhibited waveguide resonance behaviors that were correlated to interactions between the embedded plasmonic layers where the maximum value of |E| occurs at the peak wavelength. Spectral responses after the removal of the plasmonic film 24 remained substantially unchanged from responses of the as-fabricated HPD 34 within the range of measurement error, providing additional evidence that the HPD 34 remained intact even after the assembly and removal of the plasmonic films 24. Dark- and photo-currents were obtained at 77K and at applied bias voltages ranging from −500 mV to 0 V for the as-fabricated HPDs 34 and after removal of the plasmonic films 24 from the HPDs 34. The dark- and photo-currents underwent negligible changes within the range of measurement error, which confirmed that the intrinsic performance of the HPD 34 was preserved without any degradation.

The investigations described above represent development of a nanoassembly method that can occur under wet condition, enabling defect-free integration of various quasi-3D plasmonic films with a receiver substrate. Notably, aside from the use of water and room temperature conditions, the entire nanoassembly method did not require any chemical or thermal treatments or require any physical contact forces other than van der Waals contact, which expands the types of receiver substrates that can be used by the method to essentially encompass arbitrary materials and structures. The advanced features of multiple modular assemblies in an either lateral or vertical configuration, taken together with the implementation of a set of equipment for the interfacial debonding and the subsequent alignment steps, suggest the controllability and repeatability of the disclosed nanofabrication process. The constituent quasi-3D composite materials and structures presented herein are not the only options that can be achieved by this approach, and broad considerations of even more complex 3D nanostructures or nanoelectronics are foreseeable. The resulting devices utilizing the plasmonic films produced with the nanoassembly method illustrated the feasibility and utility in deterministic manipulation of a light spectrum, providing the potential for expanding the detection functionalities beyond conventional standards, for example, for enhanced target detection via multispectral and hyperspectral imaging.

For the fabrication of the silicon donor substrates 10 described above, a conventional e-beam lithography technique was performed on silicon substrates to produce various periodic nanopatterns in a photoresist layer. A thin layer (20 nm) of chromium formed by e-beam evaporator was used to serve as a selective masking layer for subsequent etching of the silicon donor substrates 10 by an anisotropic $CF_4/O_2$ plasma reactive ion etch (RIE). For the silicon donor substrates 10 formed to have nanopattern features 12 in the form of ring-shaped disks, a slightly lateral undercut-wet-etch process was added, followed by an e-beam evaporation to deposit another layer of chromium, wherein the subsequent lift-off process resulted in forming coaxial aperture arrays. For other types of silicon donor substrates 10, a brief isotropic etching was used to slightly taper the sidewalls of the nanopattern features 12 in the donor substrates 10, by about 80° from the bottom of the features 12, providing a passage for solutions (water or etching solution) to pass through efficiently (FIGS. 7A and 7B). Finally, the chromium masking layer was removed by immersion in a bath of a chromium etchant to complete the entire process.

For transmission spectra analysis, both arrays of the nanoposts and nanoholes were conceptually considered as two plasmonic layers of metallic hole array (MHA) and metallic disk array (MDA) separated by a spacer layer, along with the PMMA atop (giving rise to improving the transmission due to the Fabry-Perot cavity resonance). The waveguide (WG) resonance mode through the nanogaps formed by the periodic nanoarrays was ascribed to the interaction between MDA and MHA layers, resulting in greatly enhancing the transmission (EOT, extraordinary optical transmission) and realizing practical, easy-to-control optical filter (due to the ease of tuning the full-width at half-maximum and the peak wavelength by geometrical parameters, e.g., grating period, diameter, nanopost height, nanohole depth). These arrays could be of useful for many sensing techniques, termed algorithmic spectrometry because the suitable spectral shape of sensor's responsivities can be created by the deterministic integration of precisely engineered periodic nanoarrays with preexisting EO sensors to provide desired spectral filter shapes.

For example, periodic nanoarrays of nanowire gratings (FIG. 3C) could be used to polarize light by transmitting only a specific polarization state, i.e., only passing through light oscillating perpendicular to the metallic nanowires (p-polarized light). Such nanoarrays could provide the advantages of lowering the s-polarized transmission by using two self-aligned nanowire gratings, as compared with traditional one-dimensional metallic gratings (planar grating layer) and increasing the p-polarized transmission due to the Fabry-Perot cavity resonance in the dielectric spacer. The extinction ratio used as the performance indicator of a nanowire grating (which is given by the base-10 logarithm of the ratio of the p- and s-polarized transmission) was found to be about 15 dB at 7.55 µm with a high p-polarized transmission of 89%. In FIG. 3C, the number of distinct dips can be clearly seen around about 3.4 µm, 5.8 µm, 7 µm, and 8-9 µm, which were attributed to the PMMA absorption itself, specifically C—H bond stretching vibrations, the presence of the acrylate carboxyl group, the bending vibration of the C—H bonds, and C—O—C stretching vibration, respectively.

The last example among the representative arrays is the Au deposited on a hollow cylinder of PMMA (FIG. 3D), which was designed to isolate a wide spectral band and to exhibit a high peak transmission in the passband. The characteristic of plasmonic based bandpass filter can be easily modified with changing the geometric parameters, e.g., inner and outer radii, height of PMMA hollow cylinder, dielectric material, etc.

While the invention has been described in terms of specific or particular embodiments and investigations, it should be apparent that alternatives could be adopted by one skilled in the art. For example, quasi-3D plasmonic films of types as described above and devices and systems comprising such films could differ in appearance and construction from the embodiments described herein and shown in the drawings, process parameters such as temperatures and durations could be modified, and appropriate materials could be substituted for those noted. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A nanoassembly method comprising:
providing a donor substrate comprising periodic nanoarrays of nanopattern features formed on a surface thereof;
depositing a sacrificial layer on the surface of the donor substrate;
depositing a plasmon film onto the sacrificial layer;
depositing a dielectric spacer onto the plasmon film;
immersing the donor substrate having the sacrificial layer, plasmon film, and dielectric spacer thereon in a bath of etchant to selectively remove the sacrificial layer, wherein the plasmon film and dielectric spacer thereon adhere to the surface of the donor substrate;
mechanically separating of the dielectric spacer and the plasmon film from the donor substrate to define a quasi-three dimensional (3D) plasmonic film that comprises the dielectric spacer and the plasmon film and has periodic nanoarrays of nano-sized surface features defined by the periodic nanoarrays of nanopattern features formed on the surface of the donor substrate; and
applying the quasi-3D plasmonic film to a receiver substrate.

2. The nanoassembly method of claim 1, wherein the mechanically separating step comprises:
applying a tape material to the dielectric spacer;
mechanically peeling the tape material thereby causing intact separation of the dielectric spacer and the plasmon film from the donor substrate; and
removing the tape material from the dielectric spacer to define the quasi-3D plasmonic film.

3. The nanoassembly method of claim 2, wherein the tape material is water-soluble and is removed from the dielectric spacer by placing the tape material, dielectric spacer, and plasmon film on a surface of a quantity of water for a time sufficient to dissolve the tape material such that the quasi-3D plasmonic film remains afloat on the surface of the water.

4. The nanoassembly method of claim 3, wherein the quasi-3D plasmonic film is applied to the receiver substrate by:
immersing and anchoring the receiver substrate in the water under the quasi-3D plasmonic film;
reducing the quantity of water until the quasi-3D plasmonic film contacts a surface of the receiver substrate; and
drying the receiver substrate and quasi-3D plasmonic film to bond the quasi-3D plasmonic film to the receiver substrate.

5. The nanoassembly method of claim 4, further comprising adjusting the position of the quasi-3D plasmonic film while afloat on the water over the receiver substrate.

6. The nanoassembly method of claim 4, further comprising correcting any misalignment between the quasi-3D plasmonic film and the receiver substrate after contact therebetween by soaking the receiver substrate in water such that the plasmonic film is released intactly from the receiver substrate by surface tension of water.

7. The nanoassembly method of claim 1, wherein the donor substrate is a silicon substrate.

8. The nanoassembly method of claim 1, wherein the plasmon film is a metal and the periodic nanoarrays of nano-sized surface features of the quasi-3D plasmonic film are a metal-dielectric composite.

9. The nanoassembly method of claim 1, wherein the plasmon film comprises gold, silver, or aluminum.

10. The nanoassembly method of claim 1, wherein the dielectric spacer comprises poly(methyl methacrylate) (PMMA), benzocyclobutene (BCB), or a multifunctional bisphenol A novolak epoxy resin.

11. The nanoassembly method of claim 1, wherein the sacrificial layer and the plasmon film are deposited on the donor substrate with an e-beam evaporator process.

12. The nanoassembly method of claim 1, wherein the dielectric spacer is applied via spin-coating.

13. The nanoassembly method of claim 1, wherein the nano-sized surface features of the periodic nanoarrays of the quasi-3D plasmonic film are chosen from the group consisting of nanoposts, nanoholes, nanowire gratings, and ring-shaped disks.

14. The nanoassembly method of claim 1, further comprising annealing the quasi-3D plasmonic film to adhere the quasi-3D plasmonic film to the receiver substrate.

15. The nanoassembly method of claim 1, wherein the quasi-3D plasmonic film is a first quasi-3D plasmonic film, and the nanoassembly method further comprises sequentially securing one or more additional quasi-3D plasmonic films onto the first quasi-3D plasmonic film to yield a stack of quasi-3D plasmonic films on the receiver substrate.

16. The nanoassembly method of claim 15, further comprising annealing the stack of quasi-3D plasmonic films to adhere interfaces between the first quasi-3D plasmonic film and the one or more additional quasi-3D plasmonic films.

17. The nanoassembly method of claim 1, wherein the receiver substrate is a wafer or an electronic device.

18. A nanoassembly method comprising:
providing two or more quasi-3D plasmonic films, each of the quasi-3D plasmonic films produced by:
providing a donor substrate comprising periodic nanoarrays of nanopattern features formed on a surface thereof;
depositing a sacrificial layer on the surface of the donor substrate;
depositing a plasmon film onto the sacrificial layer;
depositing a dielectric spacer onto the plasmon film;
immersing the donor substrate having the sacrificial layer, plasmon film, and dielectric spacer thereon in a bath of etchant to selectively remove the sacrificial layer, wherein the plasmon film and dielectric spacer thereon adhere to the surface of the donor substrate; and
mechanically separating of the dielectric spacer and the plasmon film from the donor substrate to define a quasi-three dimensional (3D) plasmonic film that comprises the dielectric spacer and the plasmon film and has periodic nanoarrays of nano-sized surface features defined by the periodic nanoarrays of nanopattern features formed on the surface of the donor substrate; and
applying the two or more quasi-3D plasmonic films to a receiver substrate in a stacked configuration.

19. The nanoassembly method of claim 18, wherein each of the quasi-3D plasmonic films is applied to the receiver substrate by:
immersing and anchoring the receiver substrate in water under a first of the quasi-3D plasmonic films;
reducing the quantity of water until the first quasi-3D plasmonic film contacts a surface of the receiver substrate or a second of the quasi-3D plasmonic films previously applied to the receiver substrate; and
drying the receiver substrate and any of the quasi-3D plasmonic films thereon to bond the quasi-3D plasmonic films to the receiver substrate.

20. The nanoassembly method of claim 18, further comprising annealing the stack of the two or more quasi-3D plasmonic films to adhere interfaces therebetween.

* * * * *